(12) United States Patent
Ravn

(10) Patent No.: US 9,500,292 B2
(45) Date of Patent: Nov. 22, 2016

(54) ELECTROHYDRAULIC CONTROL VALVE

(71) Applicant: Sauer-Danfoss ApS, Nordborg (DK)

(72) Inventor: Kjeld Ravn, Sydals (DK)

(73) Assignee: DANFOSS POWER SOLUTIONS APS, Nordborg (DK)

( * ) Notice: Subject to any disclaimer, the term of this patent is extended or adjusted under 35 U.S.C. 154(b) by 66 days.

(21) Appl. No.: 14/027,412

(22) Filed: Sep. 16, 2013

(65) Prior Publication Data

US 2014/0083538 A1 Mar. 27, 2014

(30) Foreign Application Priority Data

Sep. 21, 2012 (EP) ..................................... 12006652

(51) Int. Cl.
*F16K 31/12* (2006.01)
*F15B 13/043* (2006.01)

(52) U.S. Cl.
CPC ........... *F16K 31/12* (2013.01); *F15B 13/0433* (2013.01); *F15B 2211/3144* (2013.01); *F15B 2211/329* (2013.01); *F15B 2211/355* (2013.01); *F15B 2211/6355* (2013.01); *Y10T 137/86493* (2015.04)

(58) Field of Classification Search
CPC F15B 13/0433; F15B 13/211; F15B 13/355; F15B 13/6355; F15B 13/3144; F15B 2211/3144; F15B 2211/355; F15B 2211/6355; Y10T 137/86493
See application file for complete search history.

(56) References Cited

U.S. PATENT DOCUMENTS 3,763,744 A * 10/1973 Fournell et al. ................... 91/20
4,066,103 A * 1/1978 Tandrup ................... 137/625.64
4,870,892 A * 10/1989 Thomsen et al. ............... 91/361
5,165,320 A * 11/1992 Ravn ................................. 91/31
5,313,873 A * 5/1994 Gall et al. ....................... 91/429
6,382,076 B1 * 5/2002 Alvarez Garcia ............. 91/419
6,988,508 B2 * 1/2006 Bauer et al. ................... 137/106

FOREIGN PATENT DOCUMENTS

DE            19932326 A1    1/2001
DE    10 2005 043 458 A1    3/2007
WO           2008089794 A1    7/2008

OTHER PUBLICATIONS

European Search Report Serial No. EP12006652 dated Feb. 12, 2013.
Jixie Sheji Jichu, "Foundations of Mechanical Design" Shanghai Science & Technology Press. Shanghai, China.

* cited by examiner

*Primary Examiner* — Jessica Cahill
*Assistant Examiner* — Daphne M Barry
(74) *Attorney, Agent, or Firm* — McCormick, Paulding & Huber LLP

(57) ABSTRACT

An electrohydraulic control valve comprising a valve element that is displaceable in a first direction by a pressure in a first pressure chamber and in a second direction by a pressure in a second pressure chamber. The first pressure chamber is connectable to a high pressure supply and a low pressure supply. The second pressure chamber is connectable to the high pressure supply and the low pressure supply. A first magnetic valve is connected to the first pressure chamber and a second magnetic valve is connected to the second pressure chamber. A third magnetic valve is connected to the high pressure supply and to the first magnetic valve and to the second magnetic valve. It is intended to provide an electrohydraulic control valve that is both reliable and less complex than previous valve arrangements. To this end the first magnetic valve and the second magnetic valve are three-way valves.

13 Claims, 3 Drawing Sheets

ELECTROHYDRAULIC CONTROL VALVE

CROSS REFERENCE TO RELATED APPLICATION

Applicant hereby claims foreign priority benefits under U.S.C. §119 from European Patent Application No. 12006652.7 filed on Sep. 21, 2012, the contents of which are incorporated by reference herein.

TECHNICAL FIELD

The invention relates to an electrohydraulic control valve comprising a valve element that is displaceable in a first direction by a pressure in a first pressure chamber and in a second direction by a pressure in a second pressure chamber, wherein the first pressure chamber is connectable to a high pressure supply and to a low pressure supply, and wherein the second pressure chamber is connectable to the high pressure supply and to the low pressure supply, and wherein a first magnetic valve is connected to the first pressure chamber and a second magnetic valve is connected to the second pressure chamber, and wherein a third magnetic valve is connected to the high pressure supply and to both the first magnetic valve and the second magnetic valve.

BACKGROUND

Such a control valve is for example disclosed in DE 10 2005 043 458 B4. The shown electrohydraulic control valve comprises an additional changeover valve arranged between a proportional valve and two conduits each of which leads to a pressure chamber. The proportional valve allows to adjust the pressure coming from a high pressure supply and the changeover valve is meant to direct said pressure coming from the proportional valve to one of the pressure chambers. Depending on which pressure chamber is supplied with the higher pressure from the proportional valve the valve element will be moved in one of two directions until an equilibrium between the pressure force and a force by a spring is reached. Each pressure chamber is also connected to one of two two-way magnetic valves, wherein both two-way magnetic valves lead to a low pressure supply.

For a hydraulic valve arrangement it is often required that a control valve cannot just be adjusted manually but also remotely. To this end the valve element is charged with a pressure depending upon the desired direction in which the valve element shall be moved. A pressure may then be maintained until the valve element has reached the desired position.

This functionality can be achieved in several ways.

First of all one may connect both pressure chambers to two magnetic valves each. For each pressure chamber one magnetic valve will be connected to the high pressure supply and one other magnetic valve to the low pressure supply. In order to move the valve element one pressure chamber will then be charged with a higher pressure by opening the corresponding magnetic valve leading to the high pressure supply. At the same time the other pressure chamber will be charged with a lower pressure by opening the corresponding valve leading to the low pressure supply. The two valves stay open until the valve element has reached the desired position.

Such a valve arrangement is reliable but requires four magnetic valves and the corresponding control parts. Consequently the production costs are relatively high.

An alternative way to reach the discussed functionality simply uses only two magnetic valves, each of which is arranged between the high pressure supply and one of the pressure chambers. Each pressure chamber is then connected to the low pressure supply by means of a choke. To displace the valve element one of the magnetic valves is opened. The hydraulic fluid will then flow towards the low pressure supply and charge the choke with a higher pressure. Said higher pressure will then also displace the valve element.

A valve arrangement of this kind requires only two magnetic valves and is thus cheaper in production. On the other hand some amount of hydraulic fluid is lost to displace the valve element and maintaining a non-neutral position of the valve element will usually result in a constant loss of at least some amount of hydraulic fluid.

A further alternative is to use three magnetic valves and one changeover valve as described in DE 10 2005 043 458 B4. Such a valve arrangement requires only three magnetic valves but has the disadvantage that a pressure controlled changeover valve is notoriously difficult to control. For example the pressure difference necessary to make the changeover valve change from one position into the other is usually very small. Furthermore if the proportional valve is opened unintentionally it will usually result in a flow from the high pressure supply across the changeover valve to one of the two-way valves that are open in the normal position. In this case an unwanted deflection of the valve element will result. This makes such a valve arrangement difficult to control and thus undesirable.

SUMMARY

The task underlying the invention is thus to provide an electrohydraulic control valve that is both reliable and less complex than previous valve arrangements.

The mentioned task is solved by the first magnetic valve and the second magnetic valve being three-way valves.

By choosing the first magnetic valve and the second magnetic valve to be three-way valves each of the first and second valve can connect one of the pressure chambers either with the high pressure supply or with the low pressure supply. The third magnetic valve can for example control the pressure coming from the high pressure supply. This way, only three magnetic valves are needed while the loss of the hydraulic fluid is much smaller than in the discussed two valve arrangements. At the same time no unreliable pressure controlled changeover valve is needed.

In a preferred embodiment the first magnetic valve is connected by a first port to the low pressure supply and by a second port to the first pressure chamber and by a third port to both the second magnetic valve and the third magnetic valve. This embodiment allows the first magnetic valve to connect the first pressure chamber to either the low pressure supply or the higher pressure supply. At the same time the third port leads to both the second magnetic valve and the third magnetic valve removing the need for an independent conduit from the second magnetic valve to the third magnetic valve. Since only one pressure chamber needs to be connected to the high pressure supply at a time one may in this embodiment dispense with such an independent conduit.

In another preferred embodiment the second magnetic valve is connected by a fourth port to both the low pressure supply and the third magnetic valve and by a fifth port to the second pressure chamber and by a sixth port to both the first magnetic valve and the third magnetic valve. According to this embodiment the first and second magnetic valve may again share a conduit to the third magnetic valve. At the same time the second magnetic valve may also share a conduit with the third magnetic valve to the low pressure supply. The latter may for example be beneficial if the third magnetic valve is a three-way valve. This embodiment again reduces the amount of necessary conduits without a loss of functionality.

In yet another preferred embodiment the third magnetic valve is a solenoid proportional valve. By using a solenoid proportional valve as the third magnetic valve the pressure coming from the high pressure supply can be more exactly controlled and adjusted. This allows for a better control of the electrohydraulic control valve.

In yet another preferred embodiment the third magnetic valve has an adjustable duty cycle. Such a valve can be opened and closed in rapid subsection. Depending on the duration and the ratio of being in an "open" or "closed" position an effective output pressure can be adjusted.

In another preferred embodiment the third magnetic valve is a three-way valve. This embodiment may for example allow the third magnetic valve to also utilize the low pressure supply to adjust the pressure coming from the high pressure supply. Depending on the application the third magnetic valve may then be a simple three-way valve like the first and the second magnetic valve or a more expensive proportional three-way valve.

In a further preferred embodiment the third magnetic valve in the normal position connects the low pressure supply to both the first magnetic valve and the second magnetic valve. Thus even if the first or the second magnetic valves are unintentionally in a wrong opening position a deflection of a slide will be prevented, because both pressure chambers will only be connected to the low pressure supply.

In another preferred embodiment the third magnetic valve is connected by a seventh port to the high pressure supply and by an eighth port to both the first magnetic valve and the second magnetic valve and by a ninth port to both the low pressure supply and the second magnetic valve. Such an embodiment allows to keep the number of independent conduits small.

In yet another preferred embodiment the first magnetic valve in the normal position connects the first pressure chamber with the low pressure supply, and the second magnetic valve in the normal position connects the second pressure chamber with the low pressure supply. These features will prevent an unintentional deflection of the slide in case the third magnetic valve is opened unintentionally and connects the first and second magnetic valves with the high pressure supply. In this case the fluid paths from both the first magnetic valve and the second magnetic valve will be closed to the third magnetic valve and no unwanted deflection of the slide will occur.

In still another preferred embodiment the first magnetic valve, the second magnetic valve and the third magnetic valve are all spring loaded valves. In this case on may easily select normal positions of the three magnetic valves that prevent an unintentional deflection of the slide even if one of the valves is in a wrong opening position.

BRIEF DESCRIPTION OF THE DRAWINGS

Preferred embodiments of the invention will now be described in more detail with reference to the drawings, wherein.

DETAILED DESCRIPTION

Figure 1:
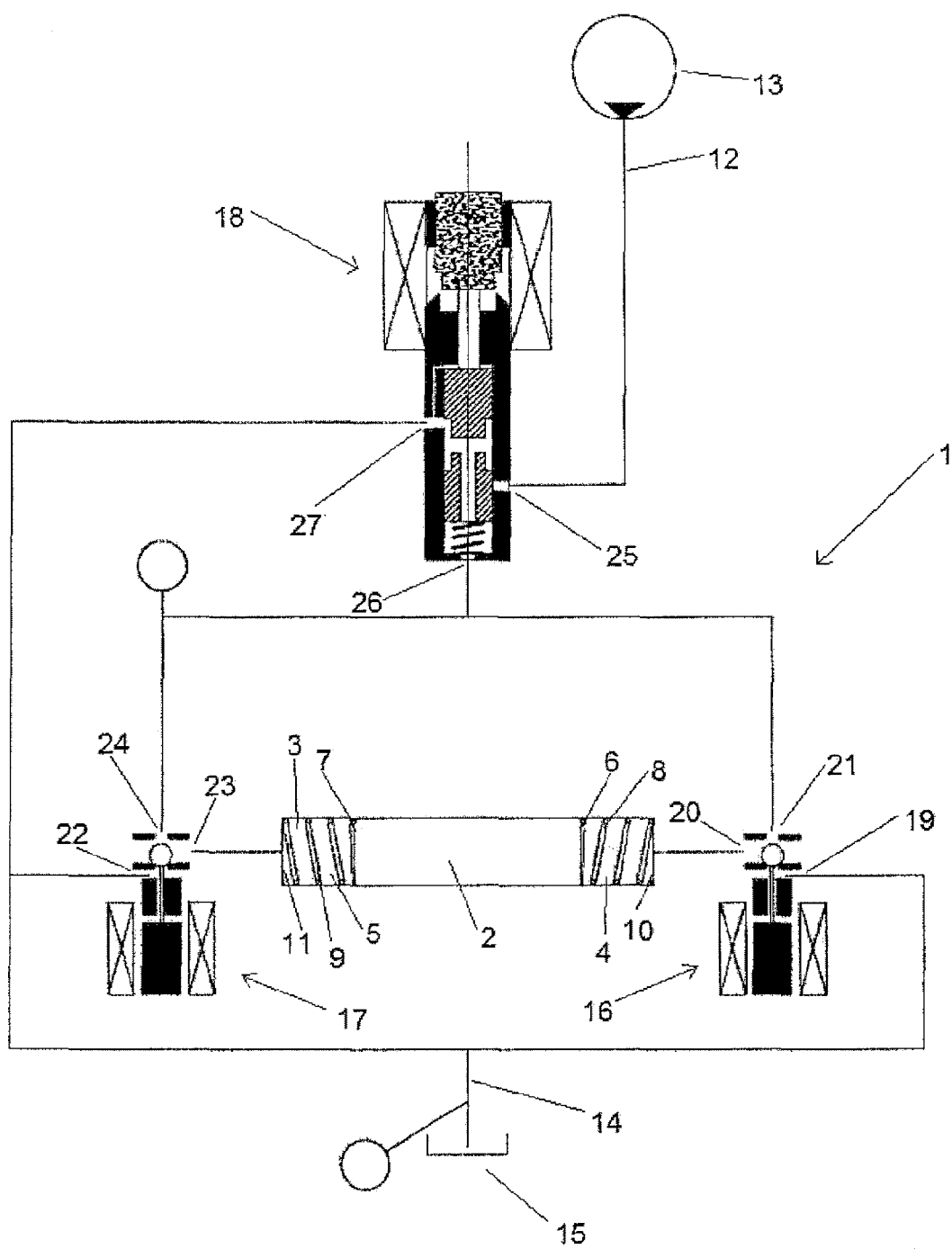
FIG. 1 shows a first embodiment according to the invention.

FIG. 1 shows an electrohydraulic control valve 1 comprising a valve element in form of a slide 2 arranged displaceable in an opening 3 of a housing. The slide 2 may for example have a rectangular or around cross section and may fit closely to grooves or flanges of the opening in a fluid tight manner.

The slide 2 is arranged between a first pressure chamber 4 and a second pressure chamber 5. The pressure in the first pressure chamber 4 charges a first face 6 of the slide 2. Accordingly the pressure in the second pressure chamber 5 charges a second face 7 of the slide 2. Depending on the pressure difference charging the faces 6, 7 the slide 2 may be moved in one of two directions.

Additionally there is an arrangement of springs 8, 9 in the pressure chambers 4, 5. Each spring 8, 9 is only attached to one of the end walls 10, 11. Alternatively one may also just use one spring that is attached to one of the end walls 10, 11 and one of the faces 6, 7.

If now for example the pressure in the first pressure chamber 4 exceeds the pressure in the second pressure chamber 5 the slide 2 will move to the right as long as the pressure force exceeds the spring force of the spring 9. The spring 8 stays in this case uncompressed.

To adjust the pressures in the pressure chambers 4, 5 there is also supplied a high pressure supply 12, which may for example be connected to a pump 13. There is also supplied a low pressure supply 14, which may for example be connected to a fluid reservoir 15.

The first pressure chamber 4 is connected to a first magnetic valve 16. The second pressure chamber 5 is connected to a second magnetic valve 17. The high pressure supply is connected to a third magnetic valve 18. In this embodiment of the invention the first and second magnetic valves 16, 17 are three-way valves while the third magnetic valve is a solenoid proportional valve.

The first magnetic valve 16 comprises a first port 19 leading to the low pressure supply 14, a second port 20 leading to the first pressure chamber 4, and a third port 21 leading to both the second magnetic valve 17 and the third magnetic valve 18.

The second magnetic valve 17 comprises a fourth port 22 leading to the low pressure supply 14 and the third magnetic valve 18, a fifth port 23 leading to the second pressure chamber 5 and a sixth port 24 leading to the first magnetic valve 16 and the third magnetic valve 18.

The third magnetic valve 18 comprises a seventh port 25 leading to the high pressure supply 12, an eighth port 26 leading to both the first magnetic valve 16 and the second magnetic valve 17, and a ninth port 27 leading to both the low pressure supply 14 and the second magnetic valve 17.

The first magnetic valve 16 and the second magnetic valve 17 are three-way valves, i.e. each of them will usually connect two of their three ports with each other. They may also be able to open and close their ports individually.

To move the slide 2 one may now for example connect the first magnetic valve 16 with the first pressure chamber 4 and the third magnetic valve 18 by opening the ports 20 and 21 and closing the port 19. At the same time one may connect the second magnetic valve to the second pressure chamber 5 and the low pressure supply 14 by opening the ports 23 and 22 while closing the port 24. The third magnetic valve 18 will then supply a high pressure from the high pressure supply 12 to the first magnetic valve 16 and the first pressure chamber 4. The second pressure chamber 5 will be connected to the low pressure supply 14 via the second magnetic valve 17. Thus the pressure charged on the first face 6 will be higher than the pressure charged on the second face 7. This results in a force moving the slide 2 to the left side until the spring force of the spring 9 becomes equally large as the pressure force acting on the face 6.

The third magnetic valve 18 may allow to adjust the pressure difference between the first and second pressure chamber 4, 5. This way the final position of the slide 2 can be more easily selected. As long as the third magnetic valve 18 maintains the selected pressure the position of the slide 2 can be maintained.

Figure 2:
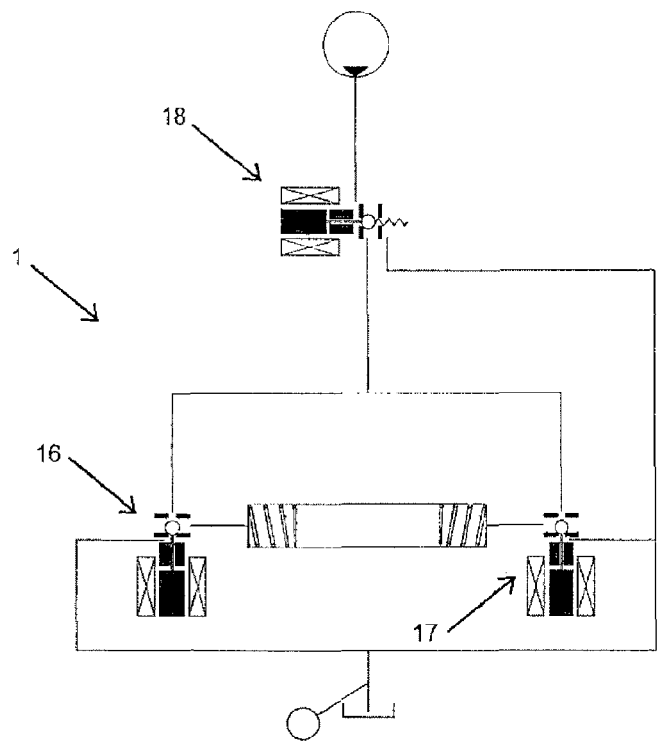
FIG. 2 shows a second embodiment according to the invention.
Figure 3:
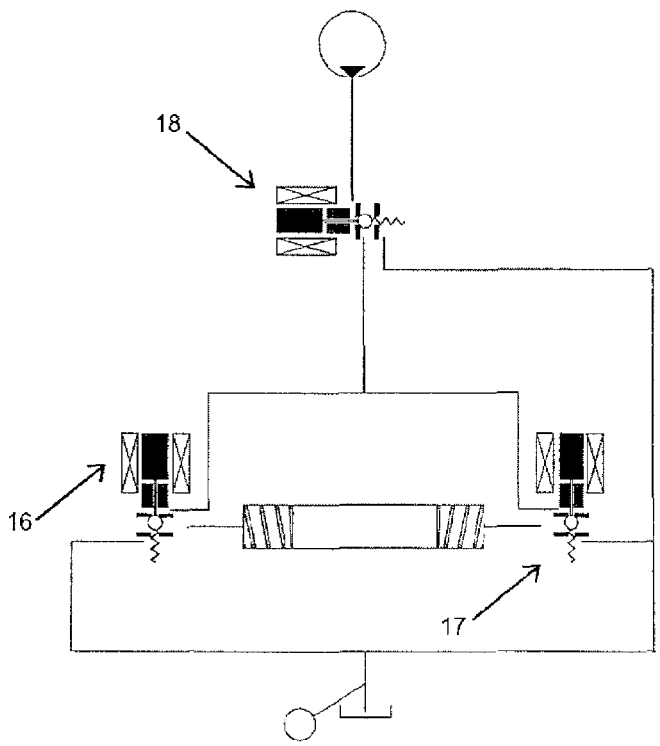
FIG. 3 shows a third embodiment according to the invention.

FIGS. 2 and 3 show alternative embodiments of the invention. In these cases the third magnetic valve 18 is a three-way valve and not a solenoid proportional valve. In case of FIG. 2 the third magnetic valve is a spring loaded three-way valve while the first and second magnetic valves 16, 17 are not spring loaded.

FIG. 3 shows an embodiment where all three magnetic valves are spring loaded three-way valves. This has the advantage that three identical valves may be used. The embodiment according to FIG. 1 may allow a more exact positioning of the slide 2 but the use of a solenoid proportional valve makes the embodiment more expensive than the embodiment shown in FIG. 2 or 3 that use three simple three-way valves. Which of the embodiments is preferable of course depends on the application.

Figure 4:
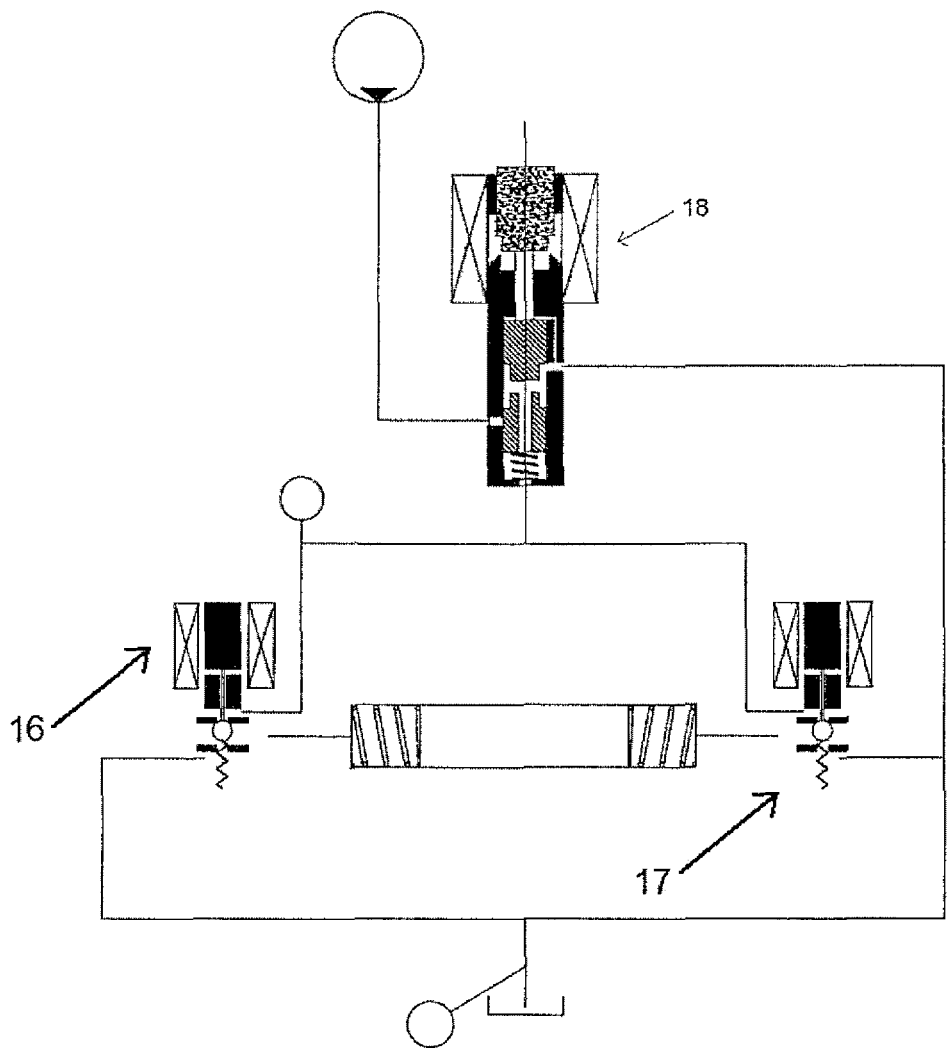
FIG. 4 shows a fourth embodiment according to the invention.

FIG. 4 shows another embodiment according to the invention. Similar to FIG. 3 all three magnetic valves are spring loaded, but in this case the third magnetic valve 18 is a solenoid proportional valve.

The embodiments according to FIGS. 3 and 4 have the advantage that the fluid path to the high pressure supply 12 is blocked in all three magnetic valves 16, 17, 18 in their respective normal positions. This results in an improved fault protection, since a wrong opening position of one of the three magnetic valves 16, 17, 18 will not lead to an unwanted deflection of the slide 2. This is a further advantage over the state of the art as disclosed in DE 10 2005 043 458 B4.

While the present invention has been illustrated and described with respect to a particular embodiment thereof, it should be appreciated by those of ordinary skill in the art that various modifications to this invention may be made without departing from the spirit and scope of the present.

What is claimed is:

1. An electrohydraulic control valve comprising:
a valve element that is displaceable in a first direction by a pressure in a first pressure chamber and in a second direction by a pressure in a second pressure chamber, wherein the first pressure chamber is connectable to a high pressure supply and to a low pressure supply, and wherein the second pressure chamber is connectable to the high pressure supply and to the low pressure supply;
a first magnetic valve;
a second magnetic valve; and
a third magnetic valve;
wherein the first magnetic is a three-way valve comprising:
a first port connectable to the low pressure supply;
a second port connected to the first pressure chamber; and
a third port connected to both the second magnetic valve and the third magnetic valve;
wherein the second magnetic valve is a three-way valve comprising:
a fourth port connectable to the low pressure supply and connected to the third magnetic valve;
a fifth port connected to the second pressure chamber; and
a sixth port connected to both the first magnetic valve and the third magnetic valve; and
wherein the third magnetic valve is connectable to the high pressure supply and is connected to both the first magnetic valve and to the second magnetic valve.

2. The electrohydraulic control valve according to claim 1, wherein the third magnetic valve is a solenoid proportional valve.

3. The electrohydraulic control valve according to claim 2, wherein the third magnetic valve is a three-way valve.

4. The electrohydraulic control valve according to claim 2, wherein the third magnetic valve has an adjustable duty cycle.

5. The electrohydraulic control valve according to claim 4, wherein the third magnetic valve is a three-way valve.

6. The electrohydraulic control valve according to claim 1, wherein the third magnetic valve is a three-way valve.

7. The electrohydraulic control valve according to claim 6, wherein the third magnetic valve in a normal position is configured to connect the low pressure supply to both the first magnetic valve and the second magnetic valve.

8. The electrohydraulic control valve according to claim 7, wherein the third magnetic valve comprises:
a seventh port connectable to the high pressure supply;
an eighth port connected to both the first magnetic valve and the second magnetic valve; and
a ninth port connectable to the low pressure supply and connected to the second magnetic valve.

9. The electrohydraulic control valve according to claim 6, wherein the third magnetic valve comprises:
a seventh port connectable to the high pressure supply;
an eighth port connected to both the first magnetic valve and the second magnetic valve; and
a ninth port connectable to the low pressure supply and connected to the second magnetic valve.

10. The electrohydraulic control valve according to claim 1,
wherein the first magnetic valve in a normal position is configured to connect the first pressure chamber with the low pressure supply; and
wherein the second magnetic valve in a normal position is configured to connect the second pressure chamber with the low pressure supply.

11. The electrohydraulic control valve according to claim 1, wherein the first magnetic valve, the second magnetic valve and the third magnetic valve are all spring loaded valves.

12. An electrohydraulic control valve comprising:
a valve element that is displaceable in a first direction by a pressure in a first pressure chamber and in a second direction by a pressure in a second pressure chamber, wherein the first pressure chamber is connectable to a high pressure supply and to a low pressure supply, and wherein the second pressure chamber is connectable to the high pressure supply and to the low pressure supply;

a first magnetic valve comprising a first port, a second port, and a third port;
a second magnetic valve comprising a fourth port, a fifth port and a sixth port;
a third magnetic valve;
wherein the first port of the first magnetic valve is connectable to the low pressure supply;
wherein the second port of the first magnetic valve is connected to the first pressure chamber;
wherein the third port of the first magnetic valve is connected to both the sixth port of the second magnetic valve and the third magnetic valve;
wherein the fourth port of the second magnetic valve is connectable to the low pressure supply and is connected to the third magnetic valve;
wherein the fifth port of the second magnetic valve is connected to the second pressure chamber; and
wherein the sixth port of the second magnetic valve is connected to both the second port of the first magnetic valve and the third magnetic valve.

13. An electrohydraulic control valve comprising:
a valve element that is displaceable in a first direction by a pressure in a first pressure chamber and in a second direction by a pressure in a second pressure chamber, wherein the first pressure chamber is connectable to a high pressure supply and to a low pressure supply, and wherein the second pressure chamber is connectable to the high pressure supply and to the low pressure supply;
a first magnetic valve comprising a first port, a second port, and a third port;
a second magnetic valve comprising a fourth port, a fifth port and a sixth port;
a third magnetic valve comprising a seventh port, an eighth port and a ninth port;
wherein the first port of the first magnetic valve is connectable to the low pressure supply;
wherein the second port of the first magnetic valve is connected to the first pressure chamber;
wherein the third port of the first magnetic valve is connected to both the sixth port of the second magnetic valve and the eighth port of the third magnetic valve;
wherein the fourth port of the second magnetic valve is connectable to the low pressure supply and is connected to the ninth port of the third magnetic valve;
wherein the fifth port of the second magnetic valve is connected to the second pressure chamber; and
wherein the sixth port of the second magnetic valve is connected to both the second port of the first magnetic valve and the eighth port of the third magnetic valve;
wherein the seventh port of the third magnetic valve is connectable to the high pressure supply;
wherein the eighth port of the third magnetic valve is connected to both the third port of the first magnetic valve and the sixth port of the second magnetic valve; and
wherein the ninth port of the third magnetic valve is connectable to the low pressure supply and is connected to the fourth port of the second magnetic valve.

* * * * *